(12) United States Patent
Oh et al.

(10) Patent No.: US 8,936,866 B2
(45) Date of Patent: Jan. 20, 2015

(54) LITHIUM SECONDARY BATTERY FOR IMPROVING BONDABILITY OF TAB TO POLYMER FILM

(71) Applicant: SK Innovation Co., Ltd., Seoul (KR)

(72) Inventors: Jeon Keun Oh, Daejeon (KR); Eun Sung Park, Daejeon (KR); Eun Joo Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 13/628,292

(22) Filed: Sep. 27, 2012

(65) Prior Publication Data

US 2013/0065113 A1    Mar. 14, 2013

Related U.S. Application Data

(62) Division of application No. 11/913,567, filed as application No. PCT/KR2006/001732 on May 9, 2006.

(30) Foreign Application Priority Data

May 12, 2005 (KR) .................. 10-2005-0039753

(51) Int. Cl.
*H01M 6/12* (2006.01)
*H01M 6/46* (2006.01)
*H01M 2/02* (2006.01)
(Continued)

(52) U.S. Cl.
USPC ........... 429/162; 429/178; 429/179; 429/180; 429/181; 429/182; 429/183; 429/184; 429/185

(58) Field of Classification Search
None
See application file for complete search history.

(56) References Cited

U.S. PATENT DOCUMENTS 6,251,537 B1 * 6/2001 Kim et al. ............. 429/181
6,660,429 B2 12/2003 O'Connell
(Continued)

FOREIGN PATENT DOCUMENTS

| JP | 11204090 A | 7/1999 |
|----|-----------|--------|
| JP | 2000-285903 A | 10/2000 |
| JP | 2002-075327 A | 3/2002 |

(Continued)

OTHER PUBLICATIONS

Machine translation of JP 2003-242961 retrieved from <http://www19.ipdl.inpit.go.jp/PA1/cgi-bin/PA1INIT?1359662915480> on Jan. 23, 2013.*

Machine translation of JP 2002-279967 retrieved from <http://www19.ipdl.inpit.go.jp/PA1/cgi-bin/PA1INIT?1359662915480> on Jul. 18, 2013.*

(Continued)

*Primary Examiner* — Cynthia K. Walls
(74) *Attorney, Agent, or Firm* — IP & T Group LLP

(57) ABSTRACT

A lithium secondary battery includes an electrode assembly having at least one tab which projects from one side of the electrode assembly, an external finishing material surrounding and sealing the tab except a distal end portion thereof and the electrode assembly, and polymer films interposed between the external finishing material and the tab to improve adhesion therebetween. When the tab has a thickness no less than a predetermined thickness, the tab is formed to have a sectional shape which ensures that an inside angle defined by one of upper and lower surfaces of the tab and an adjacent side surface of the tab becomes an obtuse angle, and the polymer films are formed to have protuberances on the inner surfaces thereof, so as to improve bondability between the tab and the polymer films.

11 Claims, 4 Drawing Sheets

(51) Int. Cl.
*H01M 2/04* (2006.01)
*H01M 2/08* (2006.01)

(56) References Cited

U.S. PATENT DOCUMENTS

2003/0148174 A1 8/2003 Gu
2004/0062983 A1 4/2004 Abe et al.

FOREIGN PATENT DOCUMENTS

| JP | 2002-279967 A | 9/2002 |
| JP | 2003242961 A | 8/2003 |
| KR | 2003-0040812 | 5/2003 |

OTHER PUBLICATIONS

JPO Office Action mailed Jan. 18, 2012 for Japanese Patent Application No. 2008-511052, which corresponds to the present application.
USPTO Office Action mailed Jul. 24, 2012 for U.S. Appl. No. 11/913,567, which corresponds to the present application.
USPTO Office Action mailed Oct. 1, 2010 for U.S. Appl. No. 11/913,567, which corresponds to the present application.
EP 06757673.6 Search Report dated Mar. 28, 2013.
An Office Action mailed Jan. 16, 2013, which issued during the prosecution of Japanese Application No. 2008-511052, which corresponds to the present application.

* cited by examiner

LITHIUM SECONDARY BATTERY FOR IMPROVING BONDABILITY OF TAB TO POLYMER FILM

CROSS-REFERENCE OF RELATED APPLICATION

This application is a Divisional of U.S. patent application Ser. No. 11/913,567, filed on Nov. 5, 2007, which is the U.S. National Phase Application under 35 U.S.C. §371 of International Application No. PCT/KR2006/001732, filed on May 9, 2006, which in turn claims priority to Korean application KR 10-2005-0039753, filed May 12, 2005. The contents of these applications are herein incorporated by reference in their entireties.

TECHNICAL FIELD

The present invention relates to a lithium secondary battery, and more particularly to a lithium secondary battery which is constructed to prevent a sealing function from being degraded around a tab when the tab has a substantial thickness.

BACKGROUND ART

These days, with the development of high-tech products such as digital cameras, cellular phones, notebook computers, hybrid cars, and so forth, research into a secondary battery, which is rechargeable, unlike a primary battery incapable of being recharged, has extensively been conducted. As the secondary battery, a nickel-cadmium battery, a nickel-metal hydride battery, a nickel-hydrogen battery, and a lithium secondary battery can be used. Among these batteries, the lithium secondary battery has an operating voltage of no less than 3.6 V and is employed as a power source for portable electronic devices or for a hybrid car having a high output level by connecting several lithium secondary batteries in series. The operating voltage of the lithium secondary battery is three times greater than that of the nickel-cadmium battery or the nickel-metal hydride battery, and the energy density of the lithium secondary battery per unit weight is excellent, so the lithium secondary battery has become been widely used throughout the world, FIG. 1 is a perspective view illustrating an exemplary lithium secondary battery. The general structure of the lithium secondary battery will be described below with reference to FIG. 1.

The lithium secondary battery 10 shown in FIG. 1 is a pouch type lithium secondary battery. The lithium secondary battery 10 has an electrode assembly 20 which is also called a battery body. Metal tabs 30 project from one side of the electrode assembly 20. The electrode assembly 20 and portions of the tabs 30 are surrounded and sealed by an external finishing material 50 which is called a pouch. The external finishing material 50 is composed of a lower part 52, which defines a space for accommodating the electrode assembly 20, and an upper part 54 which complements the lower part 52. With the distal end portions of the tabs 30 exposed to the outside, the external finishing material 50 surrounds and seals the electrode assembly 20 and the remaining portions of the tabs 30. At this time, polymer films 40 are interposed between the tabs 30 and the external finishing material 50 to bond with each other and seal the tabs 30 and the external finishing material 50.

In the lithium secondary battery 10 structured as mentioned above, the sealing function of the external finishing material 50 is regarded as an important factor. If foreign substances such as moisture or the like are externally introduced into the lithium secondary battery 10, the corrosion of the electrode assembly 20, the tabs 30 and the external finishing material 50 can proceed rapidly, or the positive and negative active materials can be damaged, whereby the functionality of the lithium secondary battery 10 can be deteriorated. Generally, the tabs 30 are formed to have a thickness of 50 to 200 μm, and in this case, no moisture introduction or electrolyte leakage was found.

Meanwhile, in the lithium secondary battery 10 as mentioned above, as the output of the battery increases, the resistance and the heat generation of the tabs 30 increase. This can be confirmed from the following mathematical expression.

$$R = r * l/s$$

$$Q = i^2 * R \qquad \text{[Mathematical Expression 1]}$$

Here, R is the resistance of the tab 30, r is the specific resistance of the tab 30, l is the length of the tab 30, s is the sectional area of the tab 30, Q is the heat generation of the tab 30, and i is a current.

Accordingly, the sectional area of the tab 30 can be increased in order to increase the output of the battery and decrease the heat generation of the tab 30. However, this method has a problem in that the thickness of the tab 30 is increased and the sealing function between the external finishing material 50 and the tabs 30 is consequently degraded.

FIG. 2 is a perspective view illustrating a state in which a tab 30' and the polymer films 40 are coupled with each other in accordance with the conventional art, and FIG. 3 is a cross-sectional view taken along the line L1-L1 of FIG. 2. As can be readily seen from FIGS. 2 and 3, in the case that the thickness d of the tab 30' increases up to no less than a predetermined value, for example, 200 μm, the polymer films 40 which surround the tab 30' cannot be brought into close contact with the side surfaces of the tab 30', as a result of which a gap A is created between the polymer films 40 and the side surface of the tab 30'. That is to say, as the external finishing material 50 and the tab 30' are not completely sealed, external moisture may be introduced into the lithium secondary battery through the gap A, or electrolyte may leak outside through the gap A.

DISCLOSURE

Technical Problem

Accordingly, the present invention has been made keeping in mind the above problems occurring in the prior art, and an object of the present invention is to provide a lithium secondary battery in which the thickness of a tab is increased in order to decrease the heat generation of the tab.

Another object of the present invention is to provide a lithium secondary battery which is constructed to maintain the sealing function around a tab even when the thickness of the tab is increased.

Technical Solution

In order to achieve the above objects, according to one aspect of the present invention, there is provided a lithium secondary battery including an electrode assembly having at least one tab which projects from a side of the electrode assembly, an external finishing material surrounding and sealing the tab except for a distal end portion thereof and the electrode assembly, and polymer films interposed between the external finishing material and the tab to improve adhesion therebetween, wherein, when the tab has a thickness no less than a predetermined thickness, the tab is formed to have a sectional shape which ensures that an inside angle defined by one of upper and lower surfaces of the tab and an adjacent side surface of the tab becomes an obtuse angle, so as to improve bondability between the tab and the polymer films.

According to another aspect of the present invention, the predetermined thickness is no less than approximately 200 μm.

According to another aspect of the present invention, the sectional shape of the tab is bilaterally symmetrical about a vertical axis, is rotationally symmetrical about a center thereof, or is upwardly and downwardly symmetrical about a horizontal axis.

According to another aspect of the present invention, the sectional shape of the tab has side surfaces each of which is rounded and connects the upper and lower surfaces of the tab with each other.

According to still another aspect of the present invention, there is provided a lithium secondary battery including an electrode assembly having at least one tab which projects from one side of the electrode assembly, an external finishing material surrounding and sealing the tab except for a distal end portion thereof and the electrode assembly, and a pair of polymer films interposed between the external finishing material and the tab so as to improve adhesion between them and covering upper and lower surfaces of the tab, wherein, when the tab has a thickness no less than a predetermined thickness, protuberances are formed on oppositely facing surfaces of the pair of polymer films so that the distance measured between the protuberances positioned adjacent to both ends of the tab is greater than a width of the tab, so as to improve bondability between the tab and the polymer films.

According to yet still another aspect of the present invention, the predetermined thickness is no less than approximately 200 μm.

BEST MODE

Figure 1:
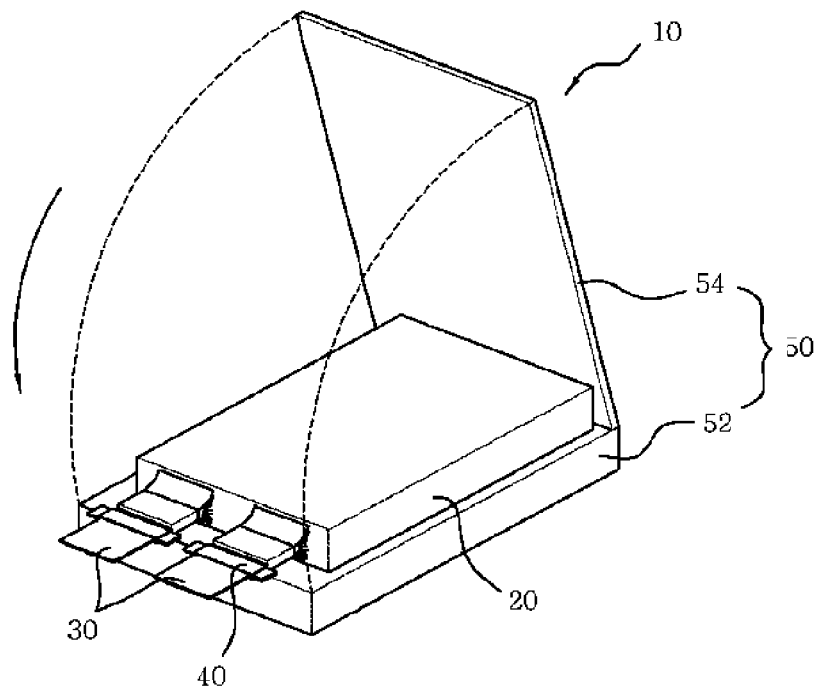
FIG. 1 is a perspective view illustrating a lithium secondary battery.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 4:
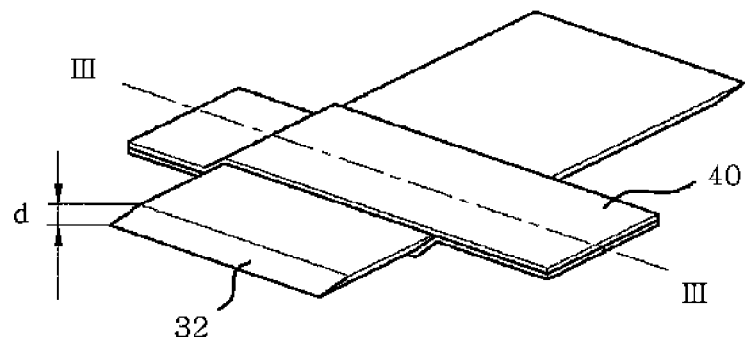
FIG. 4 is a perspective view illustrating the state in which a tab and polymer films are coupled with each other in accordance with a first embodiment of the present invention.
Figure 5:
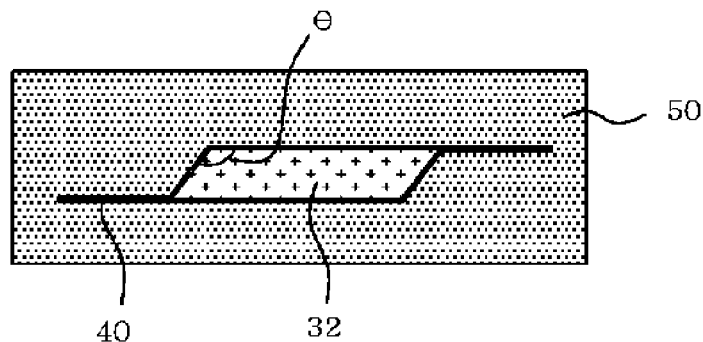
FIG. 5 is a cross-sectional view taken along the line L2-L2 of FIG. 4.

FIG. 4 is a perspective view illustrating the state in which a tab and polymer films are coupled with each other in accordance with a first embodiment of the present invention, and FIG. 5 is a cross-sectional view taken along the line L2-L2 of FIG. 4.

Referring to FIGS. 4 and 5, a lithium secondary battery in accordance with the first embodiment of the present invention is characterized in that a tab 32 has a substantial thickness d of approximately no less than 200 μm in order to decrease heat generation from the tab 32, and in that the tab 32 has a parallelogrammic sectional shape. Thereby, the tab 32 and polymer films 40 can be tightly bonded to each other, and as a consequence, an external finishing material 50 and the tab 32 are brought into close contact with each other, whereby a sealing function can be improved. When observing the sectional shape of the tab 32, each of the pair of diagonally facing corners of the tab 32 has an inside angle ? which is an obtuse angle. The sectional shape of the tab 32 is rotationally symmetrical about the center of the tab 32.

Figure 2:
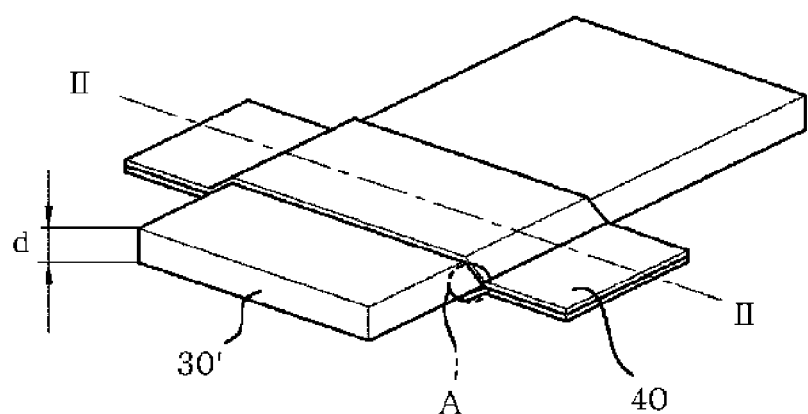
FIG. 2 is a perspective view illustrating the state in which a tab and polymer films are coupled with each other in accordance with the conventional art.
Figure 3:
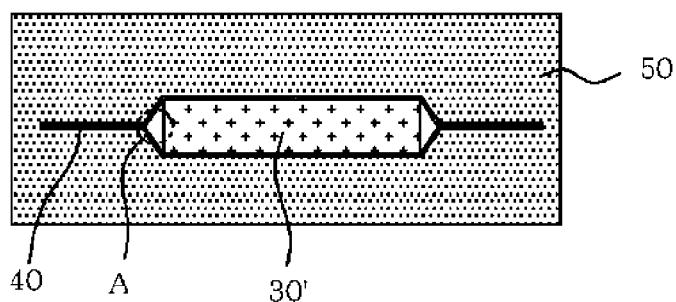
FIG. 3 is a cross-sectional view taken along the line L1-L1 of FIG. 2.

Described more concretely, in the lithium secondary battery according to the present invention, in order to decrease heat generation from the tab 32, the tab 32 has a thickness of about 200~500 μm. In this connection, as the tab 32 is formed to have the parallelogrammic sectional shape, the tab 32 and the polymer films 40 can be brought into close contact with each other. As a result, the bondability between the external finishing material 50 attached to the polymer films 40 and the tab 32 can be improved. At this time, due to the fact that the positional difference according to the thickness measured between the pair of polymer films 40 varies due to the presence of the tab 32 having the thickness d, deformation or leakage may occur in the lithium secondary battery in the course of performing a thermal pressing process or a bonding process. Nonetheless, in the lithium secondary battery according to the present invention, as the tab 32 and the polymer films 40 are brought into close contact with each other, it is possible to prevent the gap A (see FIG. 2) from being created as in the conventional art.

For reference, the external finishing material 50 comprises a stack of a heat sealing layer, a barrier layer and a base layer. In particular, the heat sealing layer is formed of polyolefin resin, and it is the norm that polymer films capable of being bonded by heat are used to ensure easy bonding thereof to the metallic tab. The polymer film can be composed of a stack of a polyolefin layer, a bondable TPX layer, and an acid-degeneration type polyolefin layer. The polyolefin layer is located to face the heat sealing layer of the external finishing material, and the acid-degeneration type polyolefin layer is located to face the metallic tab, to facilitate the bonding between the external finishing material 50 and the tab 32.

In the lithium secondary battery 10 (see FIG. 1) to which the present invention is applied, while it was described that the external finishing material 50 surrounds the electrode assembly 50 having a rectangular parallelepiped-shaped configuration, this configuration of the electrode assembly 50 is given as an embodiment of the present invention. Therefore, a person having ordinary knowledge in the art will readily appreciate that the characterizing feature of the present invention can be applied to all lithium secondary batteries having a configuration in which a metallic tab projects from an external finishing material irrespective of the shapes and sizes of the lithium secondary batteries.

Figure 6:
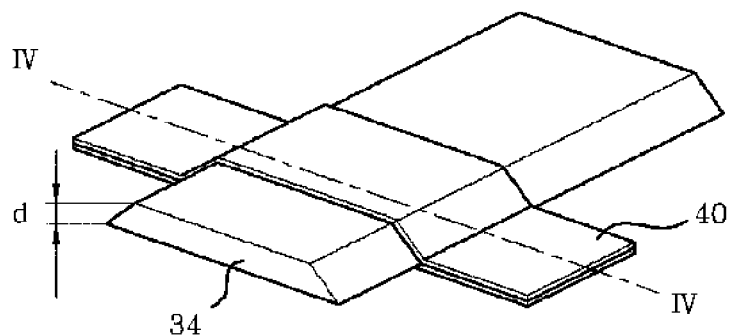
FIG. 6 is a perspective view illustrating the state in which a tab and polymer films are coupled with each other in accordance with a first variation of the first embodiment of the present invention.
Figure 7:
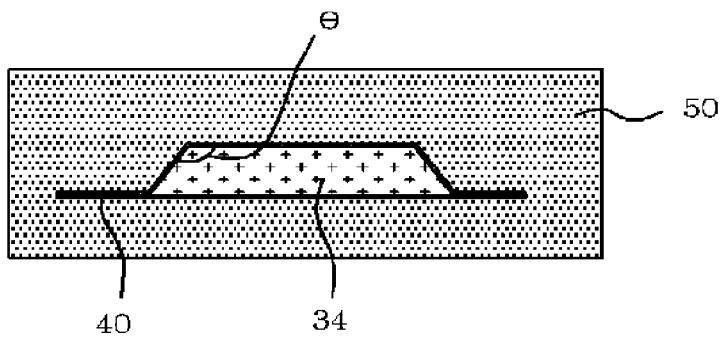
FIG. 7 is a cross-sectional view taken along the line L3-L3 of FIG. 6.

Next, FIG. 6 is a perspective view illustrating the state in which a tab and polymer films are coupled with each other in accordance with a first variation of the first embodiment of the present invention, and FIG. 7 is a cross-sectional view taken along the line L3-L3 of FIG. 6.

Referring to FIGS. 6 and 7, a lithium secondary battery in accordance with the first variation of the first embodiment of the present invention is characterized in that a tab 34 has a substantial thickness d of no less than approximately 200 μm in order to decrease heat generation from the tab 34, and in that the tab 34 has a trapezoidal sectional shape. Thereby, the tab 34 and polymer films 40 can be tightly bonded to each other, and as a consequence, an external finishing material 50 and the tab 34 are brought into close contact with each other, whereby a sealing function can be improved. When observing the sectional shape of the tab 34, each of the pair of oppositely facing upper corners of the tab 34 has an inside angle ? which is an obtuse angle. The sectional shape of the tab 34 is bilaterally symmetrical about the vertical axis of the tab 34. While the trapezoidal sectional shape having an upper surface longer than a lower surface is illustrated in FIG. 4, it is to be readily understood that the trapezoidal sectional shape may have a lower surface longer than an upper surface thereof.

Described more concretely, in the lithium secondary battery according to this variation of the present invention, as the tab 34 is formed to have the trapezoidal sectional shape, the tab 34 and the polymer films 40 can be brought into close contact with each other. As a result, the bondability between the external finishing material 50 attached to the polymer films 40 and the tab 34 can be improved. At this time, due to the fact that the lengths of the upper and lower surfaces of the tab 34 are different from each other, required amounts of the polymer films 40 are different from each other, which may cause difficulties when processing the polymer films 40. Nonetheless, in the lithium secondary battery according to the present invention, as the tab 34 and the polymer films 40 are brought into close contact with each other, it is possible to prevent the gap A (see FIG. 2) from being created as in the conventional art.

Figure 8:
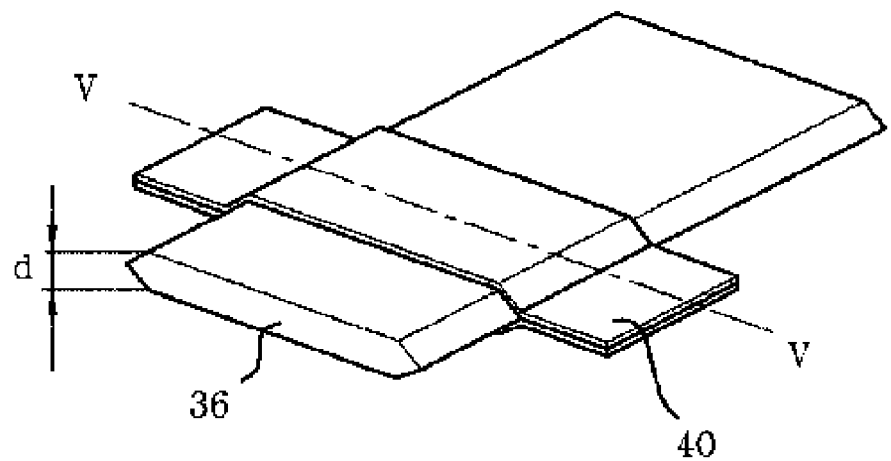
FIG. 8 is a perspective view illustrating the state in which a tab and polymer films are coupled with each other in accordance with a second variation of the first embodiment of the present invention.
Figure 9:
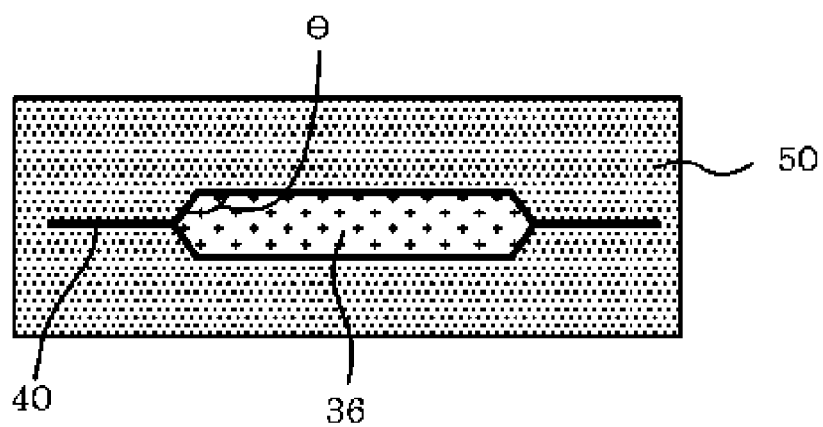
FIG. 9 is a cross-sectional view taken along the line L4-L4 of FIG. 8.

Next, FIG. 8 is a perspective view illustrating the state in which a tab and polymer films are coupled with each other in accordance with a second variation of the first embodiment of the present invention, and FIG. 9 is a cross-sectional view taken along the line L4-L4 of FIG. 8.

Referring to FIGS. 8 and 9, a lithium secondary battery in accordance with the second variation of the first embodiment of the present invention is characterized in that a tab 36 has a substantial thickness d of no less than approximately 200 μm in order to decrease heat generation from the tab 36, and in that the tab 36 has a hexagonal sectional shape which is elongated in the horizontal direction. Thereby, the tab 36 and polymer films 40 can be tightly bonded to each other, and as a consequence, an external finishing material 50 and the tab 36 are brought into close contact with each other, whereby a sealing function can be improved. When observing the sectional shape of the tab 36, each of the two upper corners and two lower corners, that is, each of four corners of the tab 36, has an inside angle ? which is an obtuse angle. The sectional shape of the tab 36 is bilaterally symmetrical about the vertical axis of the tab 36, is upwardly and downwardly symmetrical about the horizontal axis of the tab 36, and is rotationally symmetrical about the center of the tab 36.

Described more concretely, in the lithium secondary battery according to this variation of the present invention, as the tab 36 is formed to have a hexagonal sectional shape which is elongated in a horizontal direction, the tab 36 and the polymer films 40 can be brought close to each other. As a result, the bondability between the external finishing material 50 attached to the polymer films 40 and the tab 36 can be improved. Specifically, unlike the above described embodiment and variations thereof, due to the fact that the positional difference according to the thickness measured between the pair of polymer films 40 is constant and required amounts of the to polymer films 40 attached to the upper and lower surfaces of the tab 36 are the same, appropriateness can be ensured. In addition, in the lithium secondary battery according to the present invention, as the tab 36 and the polymer films 40 are brought into close contact with each other, it is possible to prevent the gap A (see FIG. 2) from being created as in the conventional art.

Figure 10:
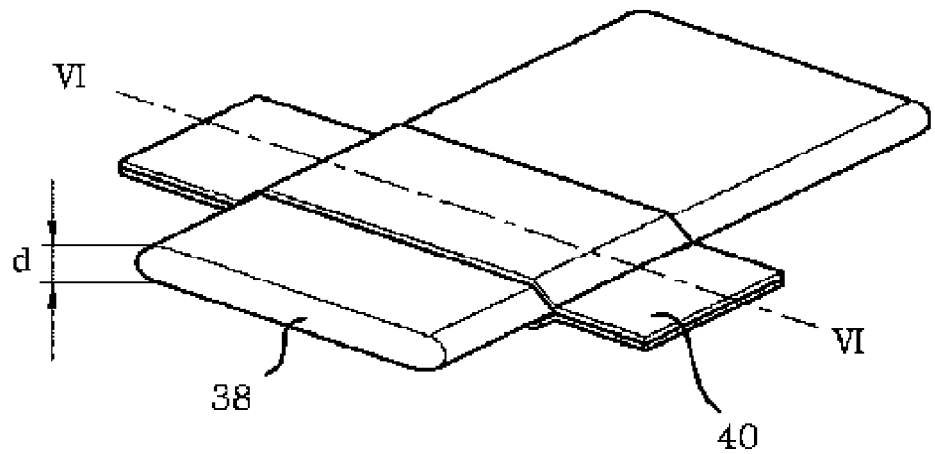
FIG. 10 is a perspective view illustrating the state in which a tab and polymer films are coupled with each other in accordance with a third variation of the first embodiment of the present invention.
Figure 11:
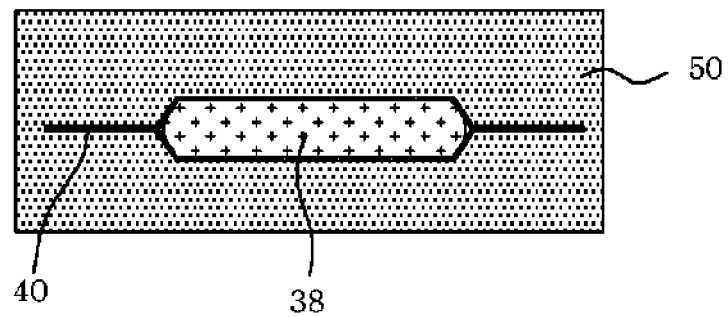
FIG. 11 is a cross-sectional view taken along the line L5-L5 of FIG. 10.

Next, FIG. 10 is a perspective view illustrating the state in which a tab and polymer films are coupled with each other in accordance with a third variation of the first embodiment of the present invention, and FIG. 11 is a cross-sectional view taken along the line L5-L5 of FIG. 10.

Referring to FIGS. 10 and 11, a lithium secondary battery in accordance with the third variation of the first embodiment of the present invention is characterized in that each side surface of a tab 38 has a rounded sectional shape. By this fact, the tab 38 and polymer films 40 can be tightly bonded to each other, and as a consequence, an external finishing material 50 and the tab 38 are brought into close contact with each other, whereby a sealing function can be improved. That is to say, as both side surfaces of the tab 38 are formed to have the rounded sectional shape, when compared to the vertical side surfaces of the conventional art, the tab 38 and the polymer films 40 can be brought into close contact with each other.

Figure 12:
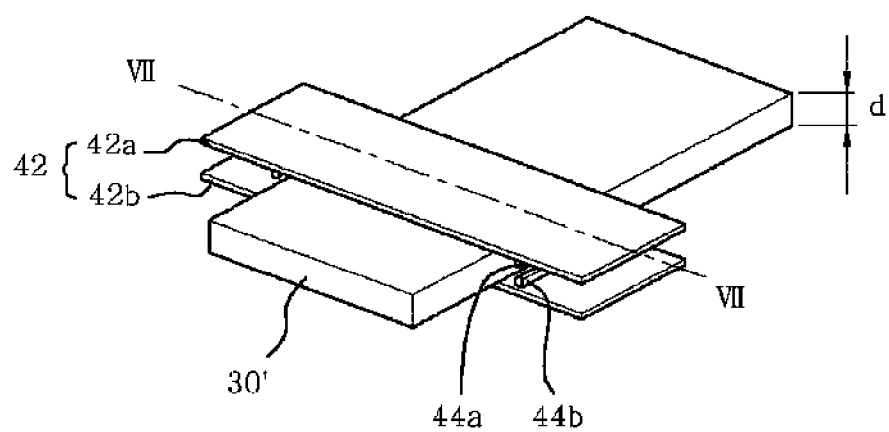
FIG. 12 is a perspective view illustrating the state in which a tab and polymer films are coupled with each other in accordance with a second embodiment of the present invention.
Figure 13:
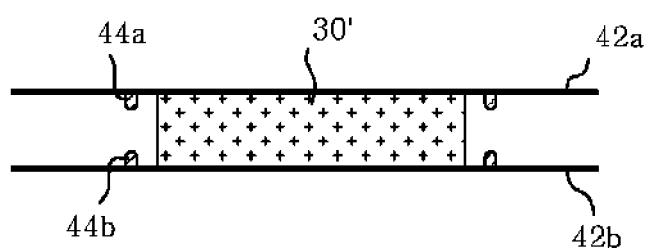
FIG. 13 and FIG. 14 are cross-sectional views taken along the line L6-L6 of FIG. 12.
Figure 14:
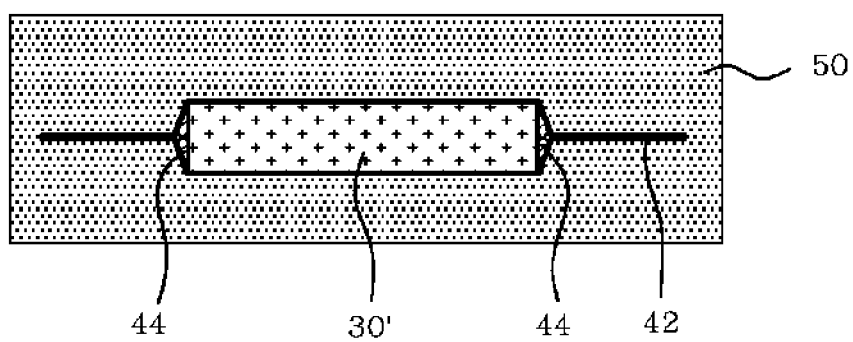

Next, FIG. 12 is a perspective view illustrating the state in which a tab and polymer films are coupled with each other in accordance with a second embodiment of the present invention, FIG. 13 is an exploded view of the tab and the polymer films, and FIG. 14 is a cross-sectional view taken along the line L6-L6 of FIG. 12.

Referring to FIGS. 12 through 14, a lithium secondary battery in accordance with the second embodiment of the present invention is characterized in that a tab 30' has a substantial thickness d of no less than approximately 200 μm in order to decrease heat generation from the tab 30', and in that protuberances 44a and 44b are formed on oppositely facing surfaces of the pair of polymer films 42 so that the distance measured between the protuberances 42a and 44a and between the protuberances 42b and 44b positioned adjacent to both ends of the tab 30' is greater than the width of the tab 30', so as to improve bondability between the tab 30' and the polymer films 42. Thereby, the tab 30' and polymer films 42 can be tightly bonded to each other, and as a consequence, an external finishing material 50 and the tab 30' are brought into close contact with each other, whereby a sealing function can be improved. That is to say, when the upper film 42a is bonded with the lower film 42b while sandwiching the tab 30' between them, as the protuberances 44a and 44b which are formed on the oppositely facing surfaces of the upper and lower films 42a and 42b are combined with each other, each region 44 which corresponds to the gap A (see FIG. 2) of the conventional art can be filled with the resultant combination of the protuberances 44a and 44b.

Described more concretely, in the lithium secondary battery according to this embodiment of the present invention, as the pair of polymer films 42 composed of the upper and lower films 42a and 42b which are formed with the protuberances 44a and 44b spaced apart by a distance greater than the width of the tab 30' having a thickness of no less than 200 μm, the tab 30' and the polymer films 42 can be brought into close contact with each other. As a result, the bondability between the external finishing material 50 attached to the polymer films 42 and the tab 30' can be improved.

INDUSTRIAL APPLICABILITY

As is apparent from the above descriptions, the present invention relates to a lithium secondary battery which employs a tab having a thickness of no less than 200 μm to decrease the heat generation from the tab. In the lithium secondary battery, in order to prevent a gap from being defined between the tab and an external finishing material (polymer films), the tab is formed to have a trapezoidal, parallelogrammic or rounded sectional shape so that bondability between the tab and the polymer films is improved. Also, in order to ensure close contact between the tab and the external finishing material (polymer films), protuberances are formed on the inner surfaces of a pair of polymer films so that bondability between the tab and the polymer films is improved.

Therefore, in the lithium secondary battery according to the present invention, by changing the sectional shape of the tab or forming the protuberances on the polymer films attached to the tab, even when the thickness of the tab is increased, a sealing function between the tab and the polymer films (that is, between the tab and the external finishing material) can be improved, whereby it is possible to prevent foreign substances such as moisture or the like from being externally introduced into the lithium secondary battery or electrolyte from leaking to the outside.

Although a preferred embodiment of the present invention has been described for illustrative purposes, those skilled in the art will appreciate that various modifications, additions and substitutions are possible, without departing from the scope and spirit of the invention as disclosed in the accompanying claim.

The invention claimed is:

1. A lithium secondary battery assembly comprising:
an electrode assembly having at least one tab which projects from a side of the electrode assembly,
a pair of upper and lower polymer films respectively covering upper and lower surfaces of the tab, wherein each of the upper and lower polymer films is in direct contact with the tab, wherein the upper polymer film has a first uniform thickness and the lower polymer film has a second uniform thickness, and
protuberances each extending from oppositely facing inner surfaces of the pair of upper and lower polymer films, positioned adjacent to both ends of the tab, and coupled to each other to seal the both ends of the tab,
wherein the distance measured between the protuberances on each film is greater than the width of the tab.

2. The battery as set forth in claim 1, wherein the thickness of the tab is no less than approximately 200 μm.

3. A lithium secondary battery comprising:
an electrode assembly having at least one tab which projects from a side of the electrode assembly,
an external finishing material surrounding and sealing the tab except for a distal end portion thereof and the electrode assembly,
a pair of upper and lower polymer films interposed between the external finishing material and the tab and respectively covering an upper surface and a lower surface of the tab, wherein each of the upper and lower polymer films is in direct contact with the tab, wherein the upper polymer film has a first uniform thickness and the lower polymer film has a second uniform thickness, and
protuberances extending from oppositely facing inner surfaces of the pair of upper and lower polymer films, positioned adjacent to both ends of the tab, and coupled to each other to seal the both ends of the tab,
wherein the distance measured between the protuberances on each film is greater than the width of the tab.

4. The battery as set forth in claim 3, wherein the thickness of the tab is 200 μm or more.

5. The battery as set forth in claim 3, wherein the thickness of the tab is approximately 200 μm to 500 μm.

6. The battery as set forth in claim 3, wherein the external finishing material includes a stack of a heat sealing layer, a barrier layer, and a base layer.

7. The battery as set forth in claim 3, wherein each of the pair of upper and lower polymer films includes a stack of a polyolefin layer, a bondable polymethylpentene resin layer, and an acid degeneration type polyolefin layer.

8. The battery as set forth in claim 1, wherein each of the protuberances extending from the upper polymer film forms a step with respect to the upper polymer film, and
wherein each of the protuberances extending from the lower polymer film forms a step with respect to the lower polymer film.

9. The battery as set forth in claim 3, wherein each of the protuberances extending from the upper polymer film forms a step with respect to the upper polymer film, and
wherein each of the protuberances extending from the lower polymer film fog is a step with respect to the lower polymer film.

10. A method for forming a lithium secondary battery assembly comprising:
providing an electrode assembly having at least one tab, wherein the tab projects from a side of the electrode assembly,
providing a pair of upper and lower polymer films over upper and lower surfaces of the tab, respectively, wherein the upper polymer film has a first uniform thickness and the lower polymer film has a second uniform thickness, wherein protuberances extend from oppositely facing inner surfaces of the pair of upper and lower polymer films, wherein each of the pair of upper and lower polymer films is in direct contact with the tab, wherein protuberances position adjacent to both ends of the tab, wherein the distance measured between the protuberances extending from each film is greater than the width of the tab, and
bonding both ends of the upper and the lower polymer films to each other so that the protuberances extending from the upper and the lower polymer films couple to each other to seal the both ends of the tab.

11. The method for forming a lithium secondary battery assembly of claim 10
   wherein each of the protuberances extending from the upper polymer film fauns a step with respect to the upper polymer film, and
   wherein each of the protuberances extending from the lower polymer film forms a step with respect to the lower polymer film.

\* \* \* \* \*